(12) United States Patent
Carberry et al.

(10) Patent No.: US 8,176,829 B1
(45) Date of Patent: May 15, 2012

(54) ARMOR SYSTEM AND METHOD OF MANUFACTURE

(75) Inventors: John Carberry, Talbott, TN (US); John Boyett, Garnet Valley, PA (US); Carl Cline, Danville, CA (US); Marcella Mirata, Las Vegas, NV (US); Katherine T. Leighton, Newark, DE (US); Wiktor Serafin, Boothwyn, PA (US); Edgar Aleshire, Elkton, MD (US)

(73) Assignee: Schott Corporation, Elmsford, NY (US)

( * ) Notice: Subject to any disclaimer, the term of this patent is extended or adjusted under 35 U.S.C. 154(b) by 502 days.

(21) Appl. No.: 12/362,256

(22) Filed: Jan. 29, 2009

Related U.S. Application Data

(63) Continuation-in-part of application No. 12/349,832, filed on Jan. 7, 2009, which is a continuation-in-part of application No. 11/689,299, filed on Mar. 21, 2007.

(51) Int. Cl.
*F41H 5/04* (2006.01)
(52) U.S. Cl. .......... 89/36.02; 89/36.01; 89/906; 89/910; 428/911
(58) Field of Classification Search ................ 89/36.01, 89/36.02; 498/911; 428/911
See application file for complete search history.

(56) References Cited

U.S. PATENT DOCUMENTS

| | | | | |
|---|---|---|---|---|
| 2,391,353 | A | * | 12/1945 | Sheridan ........................ 428/682 |
| 3,671,374 | A | * | 6/1972 | Kolarik .......................... 442/246 |
| 3,730,827 | A | * | 5/1973 | Matchen et al. ............... 428/427 |
| 4,028,476 | A | | 6/1977 | Kleinschmidt et al. ....... 428/220 |
| 4,473,653 | A | * | 9/1984 | Rudoi ............................... 501/4 |
| 4,633,756 | A | * | 1/1987 | Rudoi ........................... 89/36.02 |
| 4,869,175 | A | | 9/1989 | McDougal |
| 4,911,061 | A | * | 3/1990 | Pivitt et al. .................... 89/36.02 |
| 4,953,442 | A | * | 9/1990 | Bartuski ....................... 89/36.02 |
| 5,060,553 | A | * | 10/1991 | Jones ............................ 89/36.02 |
| 5,502,011 | A | | 3/1996 | Yamamoto et al. |
| H1567 | H | | 8/1996 | Parsons et al. ............... 89/36.02 |
| 5,783,297 | A | | 7/1998 | Wise et al. |

(Continued)

FOREIGN PATENT DOCUMENTS

GB        2 284 655        6/1995

(Continued)

OTHER PUBLICATIONS

Burge et al.; "*Thermal Expansion of Borosilicate Glass, Zerodur, Zerodur M, and Unceramized Zerodur at Low Temperatures*"; Applied Optics, 1999 vol. 38, Issue 34; pp. 7161-7162.

(Continued)

*Primary Examiner* — Bret Hayes
(74) *Attorney, Agent, or Firm* — Ohlandt, Greeley, Ruggiero & Perle, LLP (57) ABSTRACT

An armor system includes a hard face and at least one reinforcing layer covering a rear surface of the hard face. The reinforcing layer is fabricated from a glass-ceramic material exhibiting crystalline bodies throughout the mass of the glass-ceramic material. At least one resilient layer forms a rearward outer layer of the armor system. The hard face and cooperating reinforcing layers serve to disburse energy caused by the impact of an incoming projectile with the armor system, while the resilient layer serves to retain any pieces of the hard face and reinforcing layers fractured during ballistic impact. In certain embodiments, a plurality of hard faces, each with cooperating reinforcing and resilient layers, are held in parallel and spaced apart arrangement.

19 Claims, 8 Drawing Sheets

U.S. PATENT DOCUMENTS

| | | | |
|---|---|---|---|
| 5,952,253 A | 9/1999 | Dejneka et al. | 501/3 |
| 6,197,429 B1 | 3/2001 | Lapp et al. | |
| 6,334,382 B2 | 1/2002 | Gourio | 89/36.02 |
| 6,408,733 B1 * | 6/2002 | Perciballi | 89/36.02 |
| 6,862,970 B2 | 3/2005 | Aghajanian et al. | |
| 6,895,851 B1 | 5/2005 | Adams et al. | |
| 6,995,103 B2 | 2/2006 | Aghajanian | |
| 7,104,177 B1 | 9/2006 | Aghajanian et al. | |
| 7,147,544 B2 | 12/2006 | Rosenflanz | 451/28 |
| 7,157,149 B2 | 1/2007 | Belykh et al. | 428/469 |
| 2003/0035917 A1 | 2/2003 | Hyman | 428/67 |
| 2004/0020354 A1* | 2/2004 | Ravid et al. | 89/36.02 |
| 2004/0157720 A1 | 8/2004 | Sakamoto et al. | 501/4 |
| 2005/0119104 A1* | 6/2005 | Alexander et al. | 501/14 |
| 2005/0135724 A1 | 6/2005 | Helvajian et al. | |
| 2007/0068376 A1 | 3/2007 | Jones et al. | 89/36.02 |
| 2008/0092729 A1 | 4/2008 | Cook | 89/36.02 |
| 2008/0264244 A1 | 10/2008 | Ravid et al. | 89/36.02 |
| 2008/0271595 A1* | 11/2008 | Bird et al. | 89/36.02 |
| 2008/0280034 A1 | 11/2008 | Mathis et al. | 427/137 |
| 2009/0217813 A1 | 9/2009 | Carberry et al. | |
| 2010/0242715 A1* | 9/2010 | Raichel et al. | 89/36.02 |

FOREIGN PATENT DOCUMENTS

| | | |
|---|---|---|
| WO | WO03/022767 | 3/2003 |
| WO | WO2006/135832 | 12/2006 |
| WO | WO 2009/008914 A2 | 1/2009 |

OTHER PUBLICATIONS

International Search Report dated Apr. 20, 2010 for PCT/US10/000033.

* cited by examiner

Fig.10

ARMOR SYSTEM AND METHOD OF MANUFACTURE

CROSS-REFERENCE TO RELATED APPLICATIONS

This application is a Continuation-In-Part of U.S. application Ser. No. 12/349,832, filed Jan. 7, 2009; which is a Continuation-In-Part of U.S. application Ser. No. 11/689,299, filed Mar. 21, 2007.

STATEMENT REGARDING FEDERALLY-SPONSORED RESEARCH OR DEVELOPMENT

Not Applicable

BACKGROUND OF THE INVENTION

1. Field of Invention

This invention relates to ballistic armor. More specifically, this invention relates to an armor system utilizing a multi-layer structure incorporating glass-ceramics and laminates.

2. Description of the Related Art

In order to provide protection of personnel and equipment from ballistic projectiles, explosive ordnance, and forces and objects from detonation of improvised explosive devices (collectively hereinafter "projectiles"), it is necessary to provide a means of disbursing the kinetic energy of such projectiles to prevent them from reaching their target. Although this may be accomplished by interposing a large mass of any of a number of different materials between the target and the incoming projectile, experience has shown that a much more efficient means of energy disbursement is provided by suitably engineered ballistic armor structures wherein layers of different materials act to disrupt and disperse the energy of an incoming projectile. Such structures strive to maximize the amount of material which may be acted upon to absorb and disburse the energy of the projectile, while at the same time breaking or deforming the projectile and distributing these resulting fragments into a wider area. Such structures further strive to minimize the total amount of materials required for the protection of a specific area.

Ballistic armor structures generally contain one or more layers of material engineered to spread the force of the impact by deforming, deflecting, or fragmenting the ballistic projectile while the ballistic armor itself undergoes deformation or localized fragmentation. The deformation and localized fragmentation processes of the ballistic armor structure absorb a large portion of energy from the projectile while simultaneously spreading the impacted area to involve more material in successive layers. Both hardness and toughness of the ballistic armor structure are required for these functions.

In the field of ballistic armor structures, the initial layer of material used to disrupt the incoming ballistic projectile is often referred to as the "strike face," or alternatively, the "hard face." The hard face is typically a layer of relatively hard and tough material designed to deform, and in some cases fragment, to absorb at least some of the energy of the incoming projectile, thereby distributing the projectile's energy. Following the hard face are other layers specifically designed to absorb the remaining energy of the impacting material and pieces of the previous hard face. These layers are often referred to as the "backing" or "catcher."

The process of energy absorption and disbursement of the incoming projectile by the ballistic armor structure is generally intended to result in deformation, displacement and/or localized fracture of the hard face, and deformation and/or displacement of the backing, but without penetration through the ballistic armor structure by any fragments of the ballistic projectile. Selection of materials for these distinct functions and careful attention to construction and coupling of the various layers is essential to optimizing performance of the ballistic armor structure.

In many armor applications, traditional materials such as steel offer some level of protection from ballistic projectiles and shell fragments. However, great advances have been made in selection of materials for optimizing the performance of ballistic armor structures. Use of high-strength, hard, and in some cases "tough" ceramics like aluminum oxide, boron carbide, titanium diboride and silicon carbide for the hard face; and rigid or soft laminates of fibrous materials such as fiberglass, aramid, or polyethylene fiber for the backing have greatly reduced the mass and bulk of protective structures. These advances, unfortunately, are limited in the amount of ballistic energy that can reasonably be dissipated, and therefore these advances have not been readily applicable to those situations in which protection against a significant ballistic threat is required.

Accordingly, there is a need for improvement in lighter weight, thinner ballistic armor to meet the increasing threats posed by newer, more energetic, and more powerful projectiles. Specifically, there is a need for improvement in lighter weight, thinner ballistic armor which can disrupt and disburse projectiles emanating from significant ballistic threats, which can easily be utilized by personnel, vehicles, equipment, buildings, and the like.

BRIEF SUMMARY OF THE INVENTION

An armor system for limiting the transfer of impact force from a projectile and method of manufacture is disclosed herein. The armor system includes a hard face and at least one reinforcing layer covering a rear surface of the hard face. At least one resilient layer forms a rearward outer layer of the armor system.

The hard face is defined by a layer fabricated from a ballistic ceramic material. The reinforcing layer is fabricated from a glass-ceramic substance having a hardness and compressive strength, both in dynamic conditions and standard temperature and pressure conditions, sufficient to substantially absorb at least a portion of the impact from an incoming projectile. The resilient layer is selected to have a sufficient thickness and strength to withstand stresses imparted to the resilient layer under ballistic impact of the hard face. In certain embodiments, the resilient layer is fabricated from a metal, such as steel. In other embodiments, the resilient layer is fabricated from an aramid. In still other embodiments, the resilient layer is fabricated from a polymer.

In another embodiment, a plurality of hard faces are provided, each hard face being held in parallel and spaced apart arrangement with respect to one another. In this embodiment, a first hard face is selected to have a sufficient thickness and strength to partially disrupt an incoming projectile, while the second hard face is selected to have a thickness and strength sufficient to substantially absorb the remaining portion of the impact from the incoming projectile. Each hard face includes at least one reinforcing layer covering a rear surface of the hard face and at least one resilient layer covering the at least one reinforcing layer opposite the hard face.

A method of manufacture of the armor system generally includes providing a hard face, arranging at least one reinforcing layer rearward of the hard face, and arranging at least one resilient layer rearward of the reinforcing layer. In certain embodiments, bonding layers are arranged in a substantially parallel planar fashion between the various layers. The various layers are then held against one another in the substantially parallel planar configuration and heated to allow the layers to join to one another.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
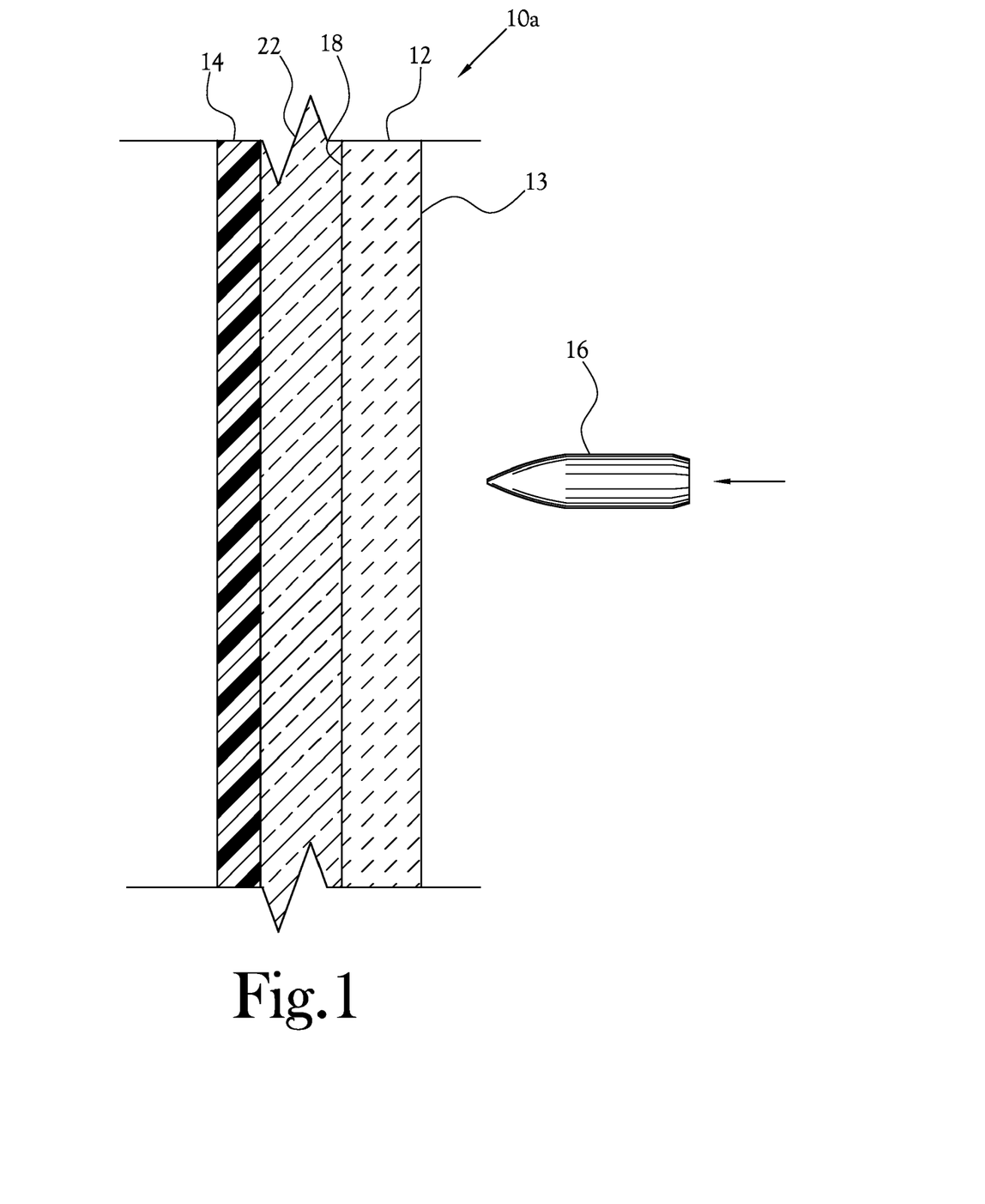
FIG. 1 is a cross-sectional view of one embodiment of the armor system constructed in accordance with several features of the present invention.

An armor system for limiting the transfer of impact force from a projectile and corresponding method of manufacture is disclosed herein. The armor system is illustrated generally at 10 in the figures. With reference to FIG. 1, one embodiment of the armor system 10a includes a hard face 12 having a front surface 13 configured to face an anticipated incoming projectile 16 and a rear surface 18 configured opposite the anticipated incoming projectile 16. At least one reinforcing layer 22 covers the rear surface 18 of the hard face 12, and at least one resilient layer 14 is disposed against the at least one reinforcing layer 22 opposite the hard face 12.

The hard face 12 is defined by a layer fabricated from a substance having a hardness and compressive strength sufficient to substantially absorb at least a portion of the impact from an incoming projectile 16. The hard face 12 can vary in thickness, configuration, density, and weight in order to enhance the projectile stopping power. It is generally understood that the stiffness of a body is a function of the thickness of the body, and that generally the thicker the hard face 12, the more effective the hard face 12 is in disrupting an incoming projectile 16. Thus, it will be understood that in selecting the overall thickness of the hard face 12, there is a weight versus effectiveness trade off in certain applications. For example, it is important that armor for personal use be lightweight, while armor for vehicle use or for building use can be of a heavier weight. It is further understood that the specific type of material suitable for use in the hard face 12 depends upon the mass, velocity, and impact characteristics of the projectile to be armored against. In the illustrated embodiment, the hard face 12 is fabricated from a ballistic ceramic material, such as boron carbide, silicon carbide, aluminum oxide, titanium diboride, or the like. In another embodiment, the hard face 12 is fabricated from a metal, such as iron, steel, aluminum, tungsten, titanium, or the like. Those skilled in the art will recognize numerous other materials suitable for use in fabrication of the hard face 12, and such materials may be used without departing from the spirit and scope of the present invention.

At least one reinforcing layer 22 is secured along the rear surface 18 of the hard face 12. The reinforcing layer 22 is fabricated from a glass-ceramic substance having a hardness and compressive strength sufficient to substantially absorb at least a portion of the impact from the incoming projectile 16. In the illustrated embodiment, one reinforcing layer 22 is laminated against the rear surface 18 of the hard face 12. However, multiple reinforcing layers 22 in varying configurations may be provided as further discussed below.

The glass-ceramic material forming the reinforcing layer 22 is generally a material produced by traditional glass making processes but having been subsequently annealed under specific conditions leading to the nucleation and growth of crystalline bodies throughout the mass of the glass-ceramic material. In one embodiment, the crystalline bodies are composed of a lithium-alumino silicate phase which is crystallized during production of the glass-ceramic material. However, those skilled in the art will recognize other materials containing suitable crystalline bodies. Increasing the crystallization of the mass of the glass-ceramic material will as a general rule, enhance its shielding power. In one embodiment, the reinforcing layer 22 is fabricated from a glass-ceramic formed of crystals having an average dimension per crystal of less than or equal to approximately two-hundred (200) nanometers. However, crystalline structures exhibiting an average dimension per crystal greater than two-hundred (200) nanometers are contemplated.

One factor to consider in deciding the specific properties of the glass-ceramic material for use in the reinforcing layer 22 is the hardness relative to the sonic velocity of the incoming projectile 16. For example, in a ballistic test of an armor system incorporating a layer of glass-ceramic material having dimensions of 18.8 inches by 18.8 inches by 4.54 inches and a density of 51.8 pounds per square foot, the armor system was able to completely disrupt four rounds of 7.62 millimeter rifle ammunition travelling at 3,180 feet per second. Another armor system incorporating a layer of glass-ceramic material of similar dimensions, but with a density of 46.3 pounds per square foot, was shown to stop three shots of 20 millimeter fragment-simulating projectiles fired at approximately 5,000 feet per second in a 160 millimeter triangular-shaped pattern against the glass-ceramic layer. Another armor system incorporating a glass-ceramic layer having dimensions of 19 inches by 19 inches by 3.49 inches and a density of 37.8 pounds per square foot was able to disrupt four rounds of 0.30-06 calibur, 165 grain APM2 rifle ammunition travelling at approximately 2,900 feet per second.

The resilient layer 14 is a material forming a rearward outer layer of the armor system 10a opposite the hard face 12. In several embodiments, the resilient layer 14 maintains at least simple intimate contact with the at least one reinforcing layer 22. The resilient layer 14 is selected to have a sufficient thickness and strength to withstand stresses imparted to the resilient layer 14 under ballistic impact of the hard face and reinforcing layers 12, 22. The maximum stress that the hard face and reinforcing layers 12, 22 impart to the resilient layer 14 is related to the specific yield stress of the hard face 12 and the specific yield stress of each of the at least one reinforcing layers 22. Specifically, the higher the yield stress of a previously encountered layer 12, 22 the less stress is imparted to the subsequent resilient layer 14. In one embodiment, the resilient layer 14 is an aramid material. In another embodiment, the resilient layer 14 is fabricated from a polymer material such as silica-covered polycarbonate or other polymer material. In yet another embodiment, the resilient layer 14 is fabricated from a metal such as steel, titanium, or the like. Those skilled in the art will recognize other materials having suitable strength for use in fabrication of the resilient layer 14.

In several embodiments, at least one bonding layer is provided between one or more of the various layers 12, 14, 22 to bond the layers together. The bonding layer is fabricated from a material exhibiting adhesion sufficient to maintain shear compliance between the various layers 12, 14, 22. In certain embodiments, the bonding layer is fabricated from a material exhibiting a coefficient of thermal expansion sufficiently low as to exhibit thermal expansion properties comparable to the glass-ceramic material. In other embodiments, the bonding layer is fabricated from a material exhibiting adhesion sufficient to maintain shear compliance between the various layers 12, 14, 22 while the layers undergo thermal expansion due to changes in temperature of the armor system 10a ranging from below freezing to over 85 degrees Centigrade. In other embodiments, the materials for fabrication of the various layers 12, 14, 22 are selected such that the various layers 12, 14, 22 adhere directly to one another absent the inclusion of a bonding layer. Those skilled in the art will recognize other suitable devices for joining the various layers 12, 14, 22, and such devices may be used without departing from the spirit and scope of the present invention. In still another embodiment, mechanical fasteners are provided to secure the various layers 12, 14, 22 in an overlapping, parallel planar configuration.

Figure 2:
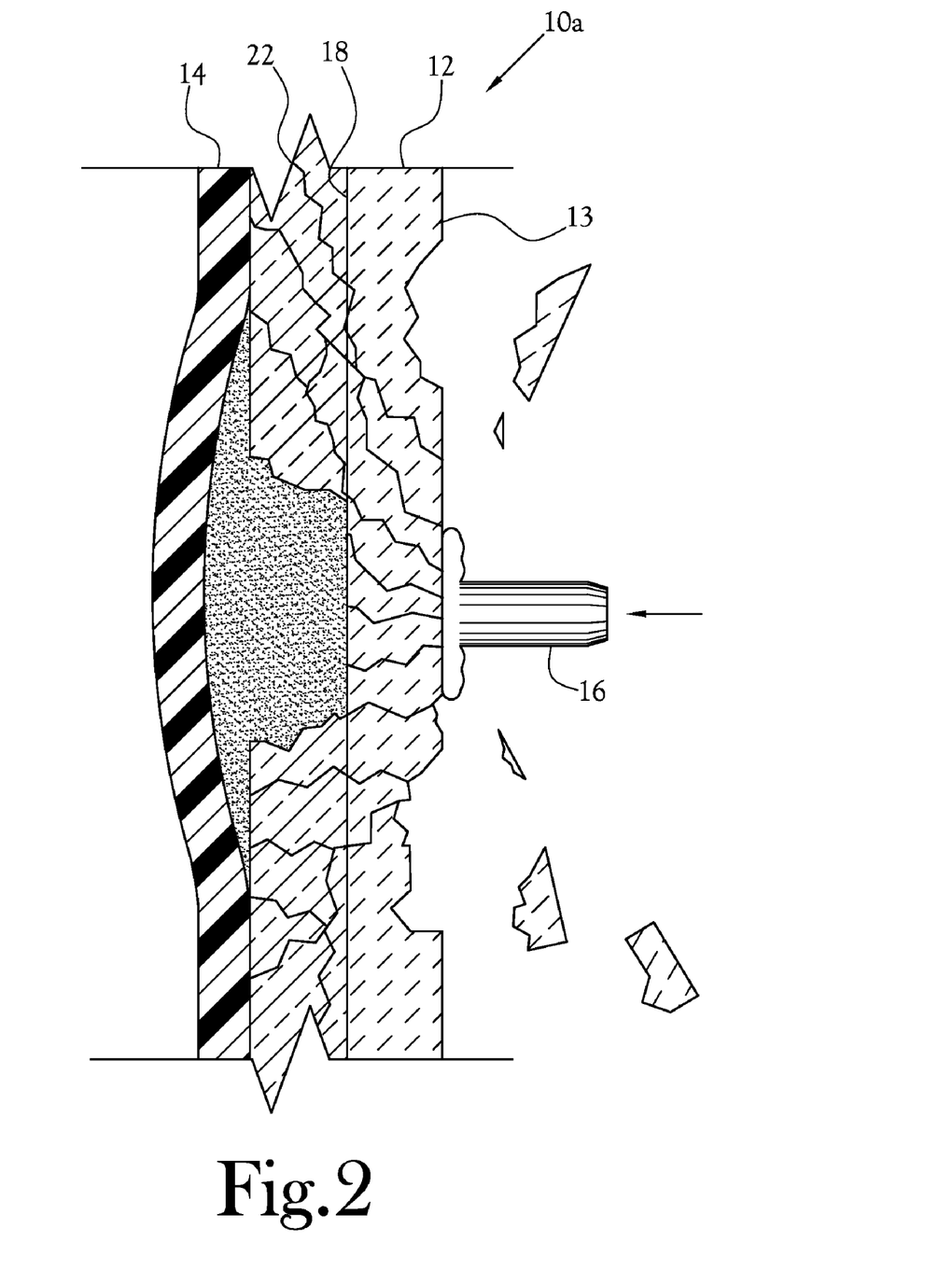
FIG. 2 is a cross-sectional view of the armor system of FIG. 1, showing a projectile impacting the hard face.

FIG. 2 illustrates the armor system 10a during the initial impact of an incoming projectile 16. As shown in FIG. 2, it is contemplated that deformation and fracture of the hard face 12 occurs in response to forces resulting from impact by the incoming projectile 16. Of course, the degree to which the hard face 12 deforms and fractures is relative to the magnitude of the impact forces of the incoming projectile 16. In applications in which the incoming projectile 16 transmits impact energy to the hard face 12 of sufficient magnitude that the hard face 12 fails to absorb substantially all of the impact energy of the incoming projectile 16, it is contemplated that at least a portion of the remaining impact energy of the incoming projectile 16 is transferred to the reinforcing layer 22. Thus, the reinforcing layer 22 serves to provide structural stability to the armor system 10a and to further absorb energy transferred to the reinforcing layer 22 from the hard face 12 during structural failure of the hard face 12 resulting from ballistic impact. Similarly to the hard face 12, it is contemplated that deformation and fracture of the reinforcing layer 22 occurs in response to the portion of the impact force transferred to the reinforcing layer 22. Also, the degree to which the reinforcing layer 22 deforms and fractures is relative to the magnitude of the impact forces transferred to the reinforcing layer 22.

It has been found that mechanical properties of glass-ceramic materials at standard temperature and pressure (STP) are dissimilar from the properties of glass-ceramic materials during the very short time intervals of a ballistic event. Specifically, plastic compression resulting from ballistic impact often alters the material properties of glass-ceramic materials during the brief period while ballistic impact occurs. As an example, in one embodiment, the reinforcing layer 22 is fabricated from a glass-ceramic material with an approximately 65% by volume non-continuous phase of crystals, each crystal having a dimension of approximately less than 100 nanometers. In this embodiment, the glass-ceramic material offers material properties during the time period of ballistic impact that are neither anticipated nor predicted by properties of the glass-ceramic material measured under standard temperature and pressure. In this embodiment, the continuous glassy phase of the glassceramic material, which is a super-cooled liquid, plastically compresses and conforms for a brief time under the pressure of a ballistic impact. This plastic compression brings the crystals into closer proximal location, thus presenting a heightened ballistic resistance exhibited by the temporarily plastically compressed glass-ceramic material. As such, it is appreciated that the inclusion of the at least one glass-ceramic reinforcing layer 22 provides an increased ability of the armor system 10 to disrupt an incoming projectile 16, as compared to a conventional hard face of comparable thickness. Alternatively, such fabrication of the reinforcing layer 22 from a glass-ceramic material allows a thinner and therefore more lightweight armor to provide similar disruption of an incoming projectile 16, as compared to a conventional ballistic armor material.

As shown in FIG. 2, the reinforcing layer 22 is selected such that, upon impact of the armor system 10a by a projectile 16 having significant impact energy, extensive fracturing and granulation of at least a portion of the reinforcing layer 22 proximate the point of impact of the projectile 16 occurs. At least a portion of the impact forces imparted to the reinforcing layer 22 are expended during fracturing of the reinforcing layer 22, and the remaining impact forces are thereafter transferred to the resilient layer 14. As the remaining forces resulting from impact by the incoming projectile 16 travel through the reinforcing layer 22 to the resilient layer 14, the extensively fractured granules of the reinforcing layer 22 cooperate to disburse and spread such impact forces to form a pressure 10ad along at least a portion of the resilient layer 14. The resilient layer 14 is selected to have a sufficient tensile strength to resist tensile failure as a result of the 10ad imparted by the granules of the reinforcing layer 22. The granules of the reinforcing layer 22 further cooperate to limit fractured pieces of the hard face 12 or the projectile 16 from impacting the resilient layer 14, thereby discouraging shear failure of the resilient layer 14 resulting from such impact.

The at least intimate contact between the resilient layer 14 and the reinforcing layer 22 provides a means for containing debris resulting from fracture of the hard face and reinforcing layers 12, 22, such as, for example, fracture resulting from projectile impact. As shown in FIG. 2, such debris containment serves to limit the various fractured pieces of the hard face 12 and the reinforcing layer 22 from propulsion through the resilient layer 14 and toward a target protected by the armor system 10a. Such debris containment further serves to retain such fractured pieces substantially within the original configurations of the hard face and reinforcing layers 12, 22, thereby improving the multi-hit performance and field durability of the armor system 10a.

Figure 3:
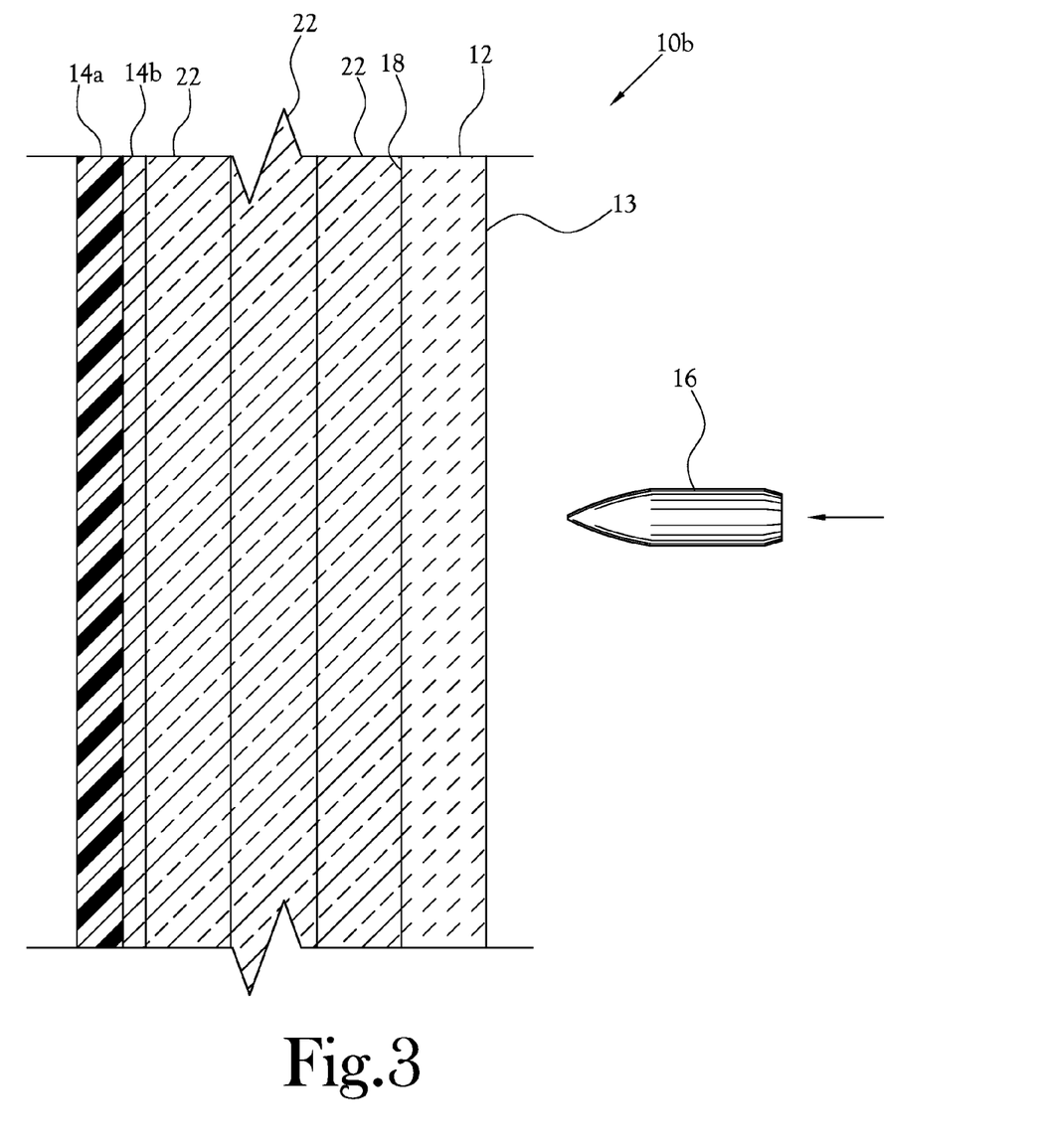
FIG. 3 is a cross-sectional view of another embodiment of the armor system.
Figure 4:
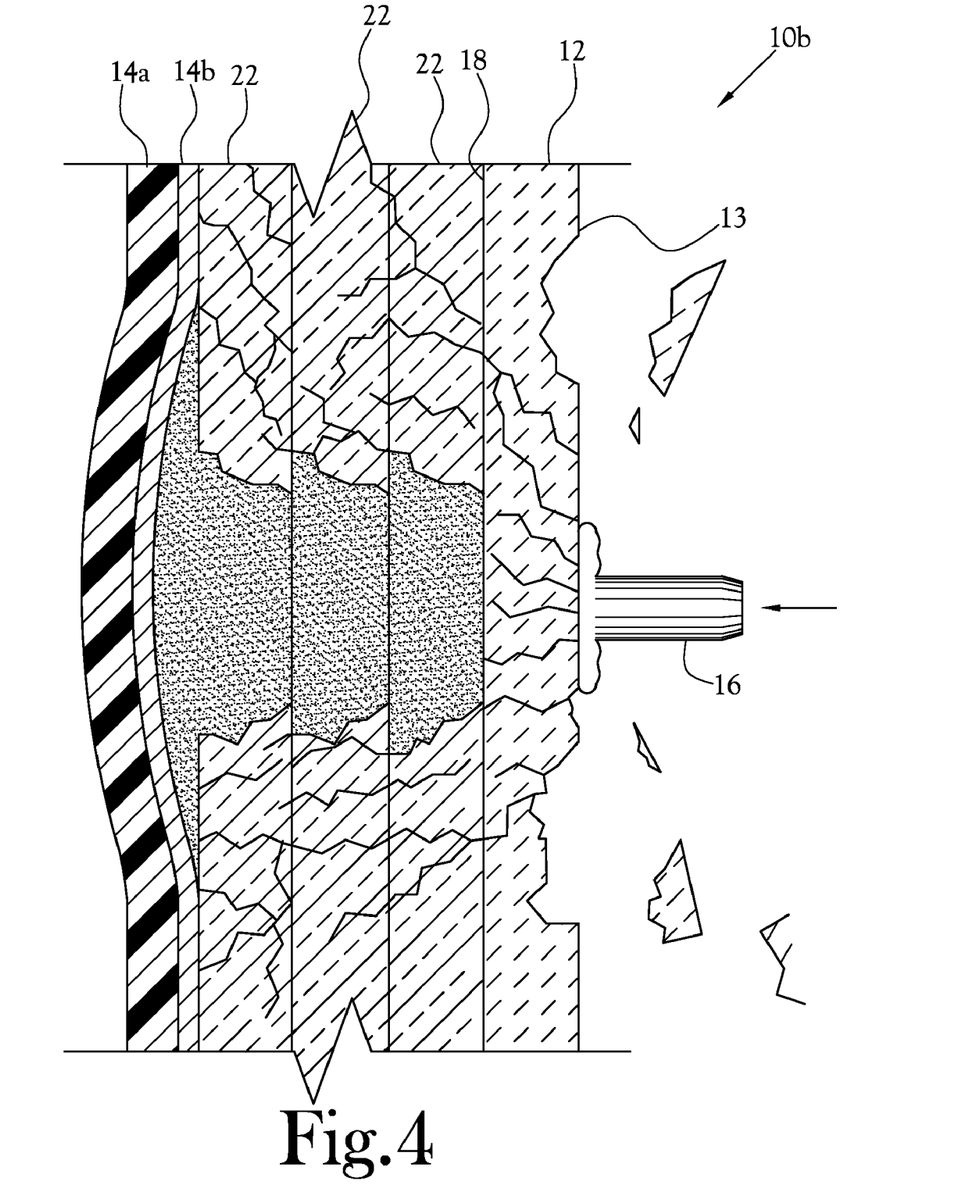
FIG. 4 is a cross-sectional view of the armor system of FIG. 3, showing a projectile impacting the hard face.

FIG. 3 illustrates another embodiment of the armor system 10b of the present invention. In the embodiment of FIG. 3, a plurality of reinforcing layers 22 are provided in a substantially overlapping, parallel planar configuration rearward of the hard face 12. As shown in FIG. 4, the various reinforcing layers 22 serve to provide structural stability to the armor system 10b and to further absorb energy transferred to the reinforcing layers 22 from the hard face 12 during structural failure of the hard face 12 resulting from ballistic impact. Each subsequent reinforcing layer 22 opposite the hard face 12 from the projectile 16 further absorbs energy transferred from the previous layer. In this configuration, it is anticipated that the amount of fracture, deformation, and other damage done to each successive layer 12, 22 decreases as the impact forces of the projectile 16 are partially absorbed by the fracture and deformation of each preceding layer 12, 22.

For each reinforcing layer 22, the layers adjacent to the reinforcing layer 22 cooperate to provide a means for containing debris resulting from the fracture of the reinforcing layer 22, such as, for example, fracture resulting from projectile impact. In this manner, the layers adjacent to each reinforcing layer 22 cooperate to maintain such debris substantially within the original configuration of the reinforcing layer 22, thereby further improving the multi-hit performance and field durability of the armor system 10b. In the illustrated embodiment of FIGS. 3 and 4, three reinforcing layers 22 are provided. However, it will be understood that any number of reinforcing layers 22 with cooperating hard face 12 and resilient layers 14 may be provided without departing from the spirit and scope of the present invention.

As shown in FIGS. 3 and 4, in one embodiment a plurality of resilient layers 14a, 14b are provided in an adjacent, overlapping configuration rearward of the reinforcing layers 22. The plurality of resilient layers 14a, 14b cooperate to resist stresses imparted to the resilient layers 14a, 14b under ballistic impact of the hard face and reinforcing layers 12, 22. In several embodiments, a first resilient layer 14a is fabricated from an aramid material, while a second resilient layer 14b is fabricated from a metal such as titanium. In this configuration, the second resilient layer 14b serves to limit fractured pieces of the hard face 12, the projectile 16, and the preceding reinforcing layers 22 from impacting the first resilient layer 14a, thereby discouraging shear failure of the first resilient layer 14a resulting from such impact. It is understood that titanium foil has been shown to elongate under certain surface pressure loading by as much as over 50% prior to exhibiting tensile failure. Thus, in a preferred embodiment, the first resilient layer 14a is fabricated from an aramid material and the second resilient layer 14b is fabricated from titanium foil. However, those skilled in the art will recognize other materials having suitable strength for use in fabrication of the various resilient layers 14a, 14b, and such materials may be used without departing from the spirit and scope of the present invention.

Figure 5:
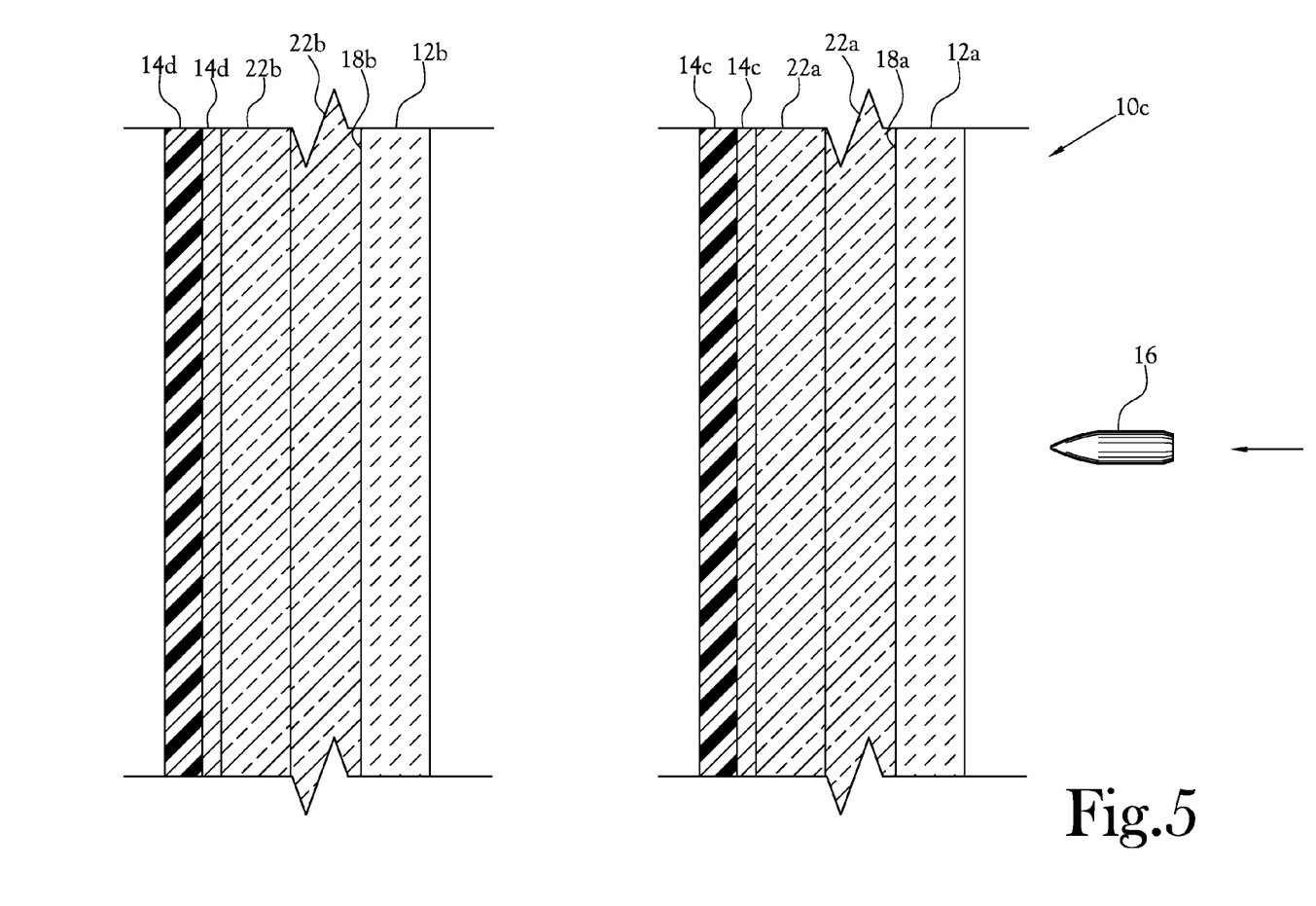
FIG. 5 is a cross-sectional view of another embodiment of the armor system, in which two spaced apart hard faces with cooperating reinforcing and resilient layers are included.

In one embodiment of the armor system 10c, as illustrated in FIG. 5, a plurality of hard faces are provided and secured in a parallel planar configuration and spaced apart therebetween. In the illustrated embodiment, a first hard face 12a and a second hard face 12b are provided. The first hard face 12a is provided with at least a first reinforcing layer 22a laminated to the rear surface 18a of the first hard face 12a, and the second hard face 12b is provided with at least a second reinforcing layer 22b laminated to the rear surface 18b of the second hard face 12b. At least a first resilient layer 14c is disposed to maintain at least intimate contact with a rear surface of the at least one first reinforcing layer 22a, and a second resilient layer 14d is disposed to maintain at least intimate contact with a rear surface of the at least one second reinforcing layer 22b. The first hard face 12a and cooperating at least one reinforcing layer 22a and resilient layer 14c are held in a spaced apart relationship relative to the second hard face 12b and cooperating at least one reinforcing layer 22b and resilient layer 14d by conventional means, such as by spaced apart fasteners, within the confines of a frame, or other conventional means.

In the illustrated embodiment, a plurality of reinforcing layers 22a, 22b are provided rearward of each cooperating hard face 12a, 12b. Each reinforcing layer 22a, 22b cooperates with adjacent resilient layers 14c, 14d and corresponding hard face layers 12a, 12b to increase the overall rigidity of the armor system 10c. While the illustrated embodiment depicts two reinforcing layers 22a, 22b provided for each hard face 12a, 12b, those skilled in the art will recognize that any number of reinforcing layers 22a, 22b may be provided to any hard face 12a, 12b, in numerous configurations, without departing from the spirit and scope of the present invention.

Figure 6:
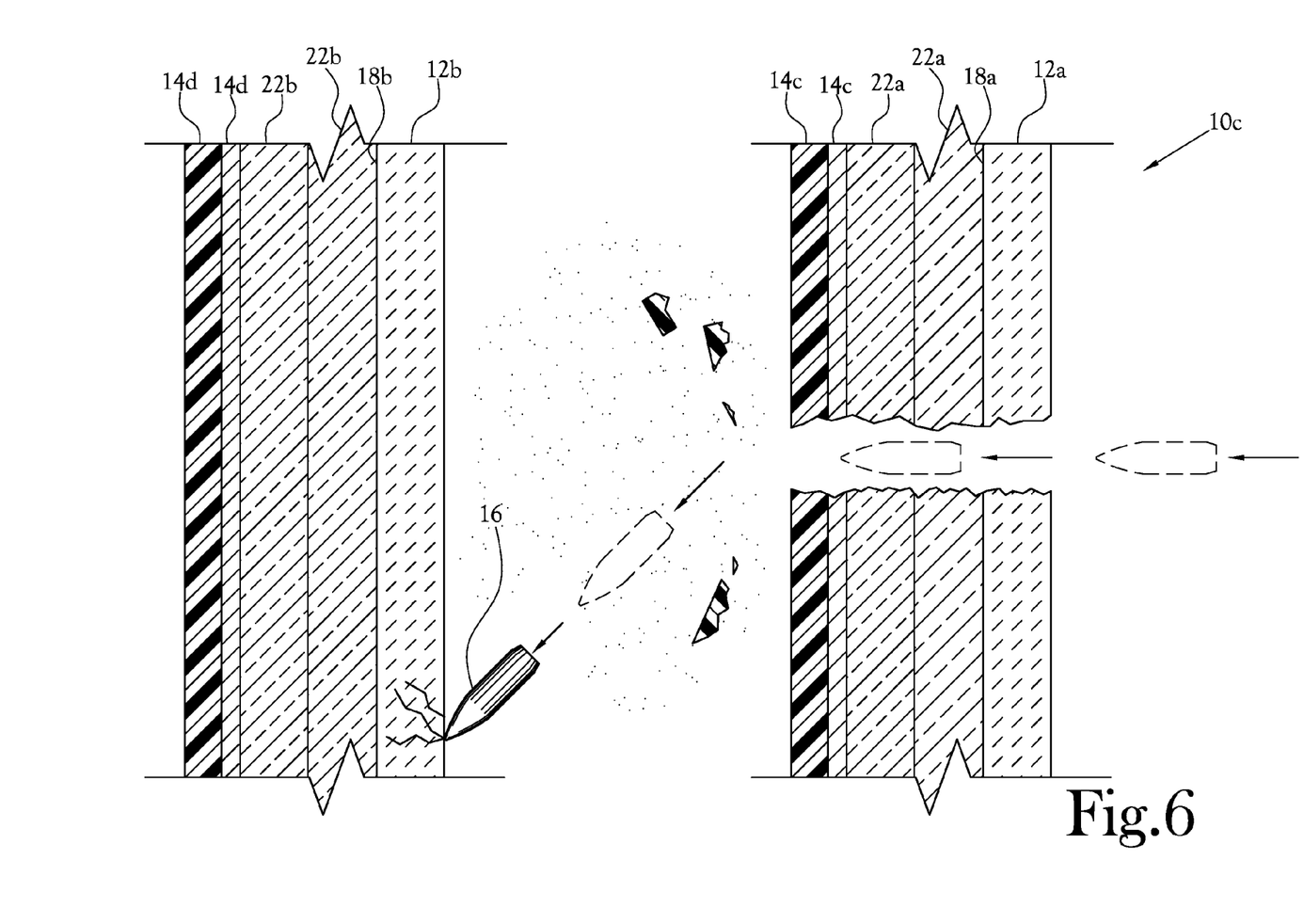
FIG. 6 is a cross-sectional view of the armor system of FIG. 5, showing a projectile impacting the armor system.
Figure 7:
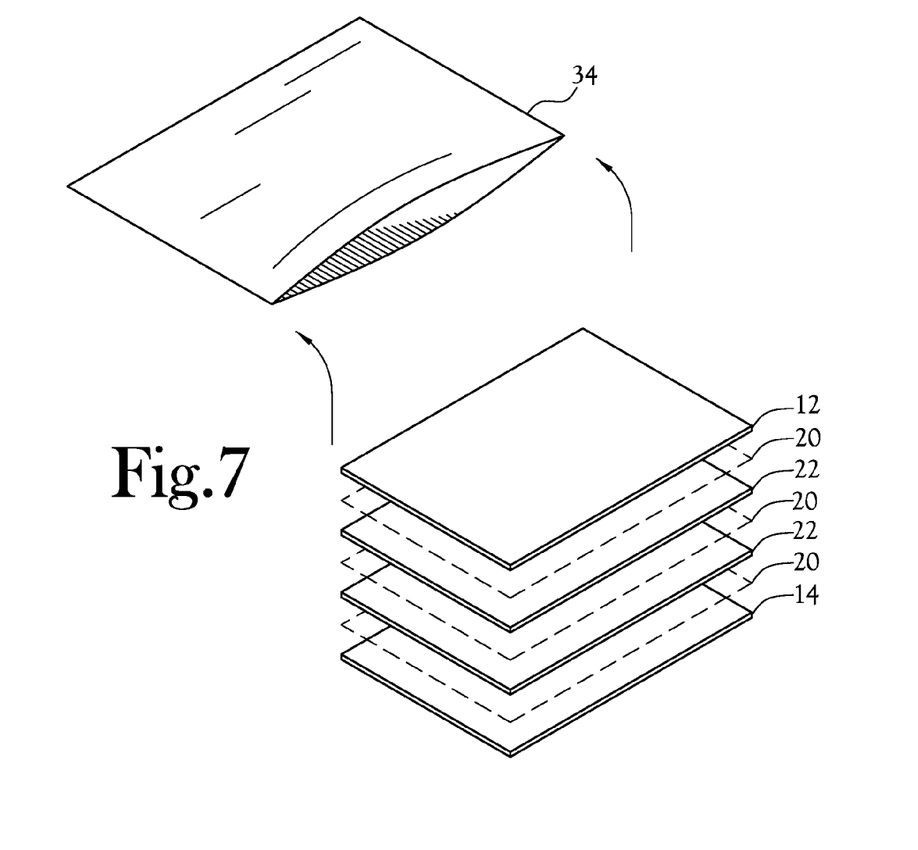
FIG. 7 is an exploded perspective view of various layers used to manufacture one embodiment of the armor system, together with a substantially airtight container.

FIG. 6 shows an incoming projectile 16 impacting the armor system 10c of FIG. 5. Referring to FIG. 6, in the present embodiment, the first hard face 12a and cooperating reinforcing layers 22a are each selected to have a sufficient thickness and strength to absorb a portion of the impact from an incoming projectile 16. As the incoming projectile 16 impacts the first hard face 12a, deformation and fracture of the portions of the first hard face 12a and cooperating reinforcing layers 22a local to the area of impact of the projectile 16 is contemplated. In several embodiments, complete disruption of the incoming projectile 16 by the first hard face 12a is contemplated. In these embodiments, the spacing of the first hard face 12a and cooperating reinforcing and resilient layers 22a, 14a proximate the second hard face 12b allows for multiple impacts to armor system 10c before damage to the second hard face 12b occurs. In certain impact scenarios involving impact of the armor system 10c by high-energy projectiles 16, penetration of the first hard face 12a and cooperating reinforcing layers 22a by the projectile 16 is also contemplated, such that, upon penetration of the first hard face 12a and cooperating reinforcing layers 22a by the projectile 16, at least partial disruption of the projectile 16 by the first hard face 12a and cooperating reinforcing layers 22a occurs. In several embodiments, it is contemplated that such partial disruption results in a change in the trajectory of the projectile 16 following penetration of the first hard face 12a. In other embodiments, it is contemplated that the partial disruption of the projectile 16 by the first hard face 12a promotes a tendency for the projectile 16 to begin to tumble along its new trajectory.

In several embodiments, it is contemplated that partial disruption of the projectile 16 results in fracture of the projectile 16 into a plurality of pieces. Accordingly, the spacing of the first hard face 12a and cooperating reinforcing and resilient layers 22a, 14c proximate the second hard face 12b is selected so as to allow the various fractured pieces of the projectile 16 to spread apart as the projectile 16 assumes its changed trajectory following penetration of the first hard face 12a and cooperating reinforcing layer 22a and resilient layer 14c, prior to impact with the second hard face 12b. It is understood that the specific spacing of the first hard face 12a and cooperating reinforcing and resilient layers 22a, 14c proximate the second hard face 12b depends upon the shape, size, mass, velocity, and impact characteristics of the projectile to be armored against, as well as the thickness of the respective hard face layers and the resultant ability of the hard face layers to effect change of the trajectory of the impacted projectile 16. For example, a relatively heavy and fast-moving projectile, such as certain high powered rifle bullets or explosive fragments, may require an increased spacing of the first hard face 12a and cooperating reinforcing and resilient layers 22a, 14c proximate the second hard face 12b, of a given thickness and composition of hard face and cooperating reinforcing and resilient layers, in order to allow the projectile pieces to spread apart, while a relatively short, light, slower-moving projectile, such as certain handgun bullets, may require less spacing of the first hard face 12a and cooperating reinforcing and resilient layers 22a, 14c proximate the second hard face 12b before such spreading of the projectile pieces occurs.

As shown in FIG. 6, it is anticipated that, upon partial disruption of the projectile 16 by the first hard face 12a and cooperating reinforcing layers 22a, and upon the resultant promotion of tumbling of the projectile 16, the partially disrupted projectile 16 impacts the second hard face 12b. To this extent, it is understood that the partial disruption of the projectile 16 by the first hard face 12a results in impact characteristics of the projectile 16 which are generally less focused along the original trajectory of the projectile 16 than those of the projectile 16 prior to impact with the first hard face 12a. Thus, the forces of impact of the partially disrupted projectile 16 are applied to an increased surface area of the second hard face 12b. Furthermore, such forces of impact of the partially disrupted projectile 16 are applied to the second hard face 12b along a trajectory which is directed at an oblique angle to the second hard face 12b. In this manner, the partial disruption of the projectile 16 by the first hard face 12a serves to decrease the ballistic effectiveness of the projectile 16 while promoting the effectiveness of the second hard face 12b at completely disrupting the projectile 16.

It will be understood by one skilled in the art that additional benefits of the various features of the embodiment of the armor system 10c shown in FIGS. 5-6 will be readily apparent to one of ordinary skill in the art. To this extent, the embodiment of FIGS. 5-6 allows for the provision of a armor panel having a reduced amount of material per unit area, and thus, a lighter armor panel. Alternatively, the embodiment of FIGS. 5-6 allows for an increased effectiveness of the armor panel as compared to an armor panel of equal weight per unit area. The spaced apart relationship of the first hard face 12a and cooperating reinforcing and resilient layers 22a, 14c proximate the second hard face 12b of the present embodiment allows for the placement therebetween of a thermally insulative material, such as air, argon gas, nitrogen gas, insulative liquid, or other thermally insulative material. In this respect, the embodiment of FIGS. 5-6 provides an armor panel having improved thermally insulative qualities as compared to conventional armor panels. Other benefits of the various features of the present embodiment of the armor system 10c will be recognized by one skilled in the art.

FIGS. 7-10 pertain to a method of manufacture of the armor system 10, also disclosed herein. As is further discussed below, the method of manufacture generally includes providing a hard face 12, arranging at least one reinforcing layer 22 rearward of the hard face 12, and arranging at least one resilient layer 14 rearward of the reinforcing layer 22. In an embodiment in which bonding layers are provided, the bonding layers 20 are arranged in a substantially parallel planar fashion between at least two of the various layers 12, 14,22. The various layers 12, 14, 20, 22 are then held together in the substantially parallel planar configuration and allowed to join to form a laminate structure 36.

Figure 8:
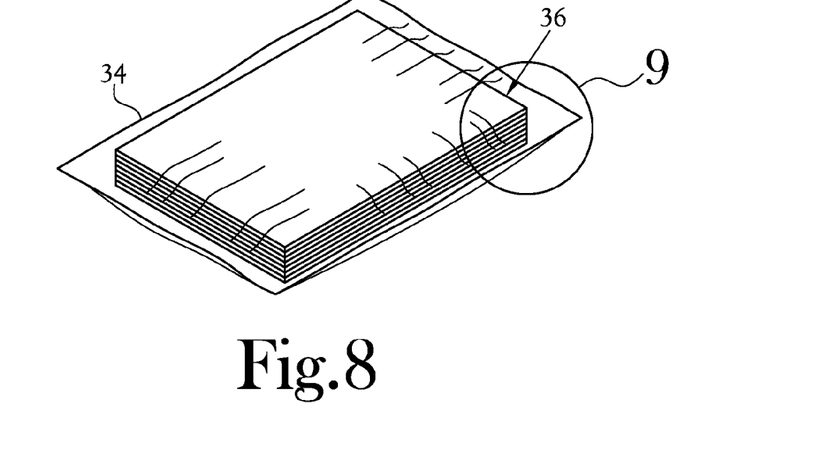
FIG. 8 is a perspective view of the materials of FIG. 7, showing the substantially airtight container containing the laminate structure, with the airtight container sealed and evacuated.
Figure 9:
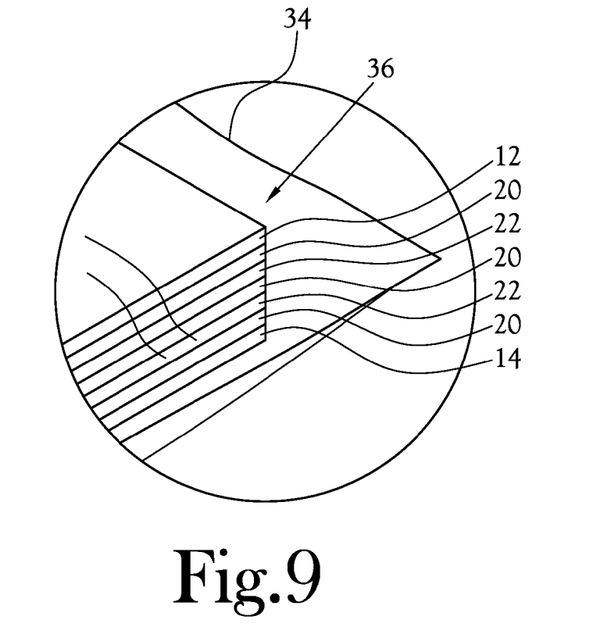
FIG. 9 is a perspective view showing one corner of the substantially airtight container of FIG. 8.
Figure 10:
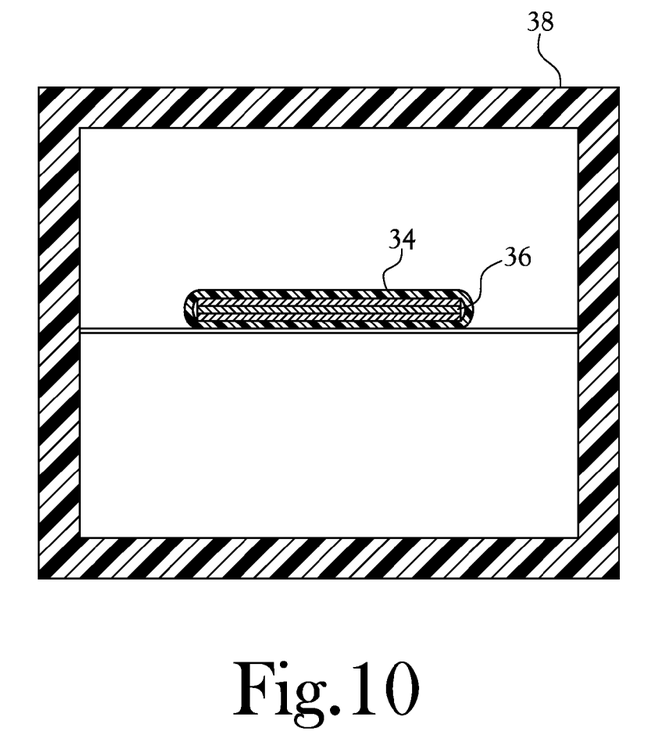
FIG. 10 is a cross-sectional view of a vessel containing the sealed and evacuated container of FIG. 9.

In the embodiment of the method illustrated in FIGS. 7-10, a substantially compliant and substantially airtight container 34 is provided to hold the various layers in the substantially parallel planar configuration. The container 34 is of approximate dimensions and volume to contain a panel fabricated from the armor system 10. As shown in FIG. 8, the laminate structure 36 is placed within the container 34. The container 34 is then sealed and evacuated to a low pressure, thereby forcing the various components of the laminate structure 36 into close proximity. As shown in FIG. 10, while still evacuated, the container 34 containing the laminate structure 36 is placed into a vessel 38. The vessel 38 is then heated, such that the laminate structure 36 is heated to a temperature in which at least every other layer is thermally expanded, softened, and becomes adhesive.

Gaseous pressure is thereafter applied inside the vessel 38, exterior to the container 34. The combination of temperature of the laminate structure 36 and pressure within the vessel 38 is maintained for a sufficient time as to allow a desirable amount of lamination within the laminate structure 36. In one embodiment, lamination within the laminate structure 36 is continued until such point that temperature reduction of the laminate structure 36 absent excessive deleterious residual stresses within the laminate structure 36 is possible. When a desirable amount of lamination within the laminate structure 36 has been reached, the temperature of the laminate structure 36 is reduced, such as to firmly set the various layers 12, 14, 20, 22 in lamination to one another, thereby forming a finished armor system 10. The pressure in the vessel 38 and the vacuum in the container are then released, and the finished armor system 10 is removed.

From the foregoing description, it will be understood that an armor system 10 and method of manufacture have been provided. The armor system provides a ballistic armor structure which is capable of providing ballistic protection comparable to conventional armor structures, but with reduced aerial weight as compared to the conventional armor structures. The armor system provides a laminate structure exhibiting cohesive interlaminar strength, multi-hit capability, thermal environment stability, and light weight. Furthermore, the armor system provides a ballistic armor structure which is capable of providing increased ballistic protection compared to a conventional armor structure of similar aerial weight.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of the applicant's general inventive concept.

Having thus described the aforementioned invention, what is claimed is:

1. A ballistic armor comprising:
   a first layer having a front surface and a rear surface, wherein said first layer is fabricated from a material selected from the group consisting of ballistic ceramic and metal;
   at least one second layer disposed along said rear surface of said first layer, said second layer fabricated from a glass-ceramic material comprising a glass phase and a crystalline phase; and
   at least one third layer substantially covering said second layer opposite said first layer, said at least one third layer limiting rear spall resulting from fracturing of said first layer due to ballistic impact.

2. The ballistic armor of claim 1, wherein said at least one third layer is fabricated from a material selected from the group consisting of an aramid, a polymer, and a metal.

3. The ballistic armor of claim 2, wherein said at least one third layer is fabricated from titanium.

4. The ballistic armor of claim 1, wherein said at least one third layer includes a third layer and a fourth layer, said third layer being fabricated from a metal and said fourth layer being fabricated from a material selected from the group consisting of an aramid, a polymer, and a metal.

5. The ballistic armor of claim 4, wherein said third layer is disposed along said second layer and said fourth layer is disposed along said third layer opposite said second layer.

6. The ballistic armor of claim 4, wherein said fourth layer is fabricated from titanium.

7. The ballistic armor of claim 1, further comprising a first bonding layer disposed between said first layer and said second layer, said first bonding layer securing said second layer to said rear surface of said first layer.

8. The ballistic armor of claim 7, further comprising a second bonding layer disposed between said at least one second layer and said at least one third layer, said second bonding layer securing said at least one third layer to said rear surface of said at least one second layer.

9. The ballistic armor of claim 1, wherein said first layer is fabricated from a material selected from the group consisting of boron carbide, silicon carbide, and steel.

10. The ballistic armor of claim 1, wherein said at least one second layer includes a plurality of glass-ceramic layers.

11. The ballistic armor of claim 10, further comprising a bonding layer disposed between said glass-ceramic layers, said bonding layer securing said glass-ceramic layers in an overlapping parallel planar configuration proximate one another.

12. The ballistic armor of claim 1, wherein said crystalline phase is fabricated from a lithium aluminosilicate.

13. The ballistic armor of claim 1, wherein said crystalline phase comprises crystalline bodies having an average dimension of less than or equal to approximately 200 nanometers.

14. An armor system for opposing an incoming projectile, said armor system comprising:

a plurality of armor layers arranged substantially parallel to and spaced apart from one another, each of said plurality of armor layers comprising:
a hard face having a front surface and a rear surface, wherein said hard face is fabricated from a material selected from the group consisting of ballistic ceramic and metal;
a plurality of overlapping glass-ceramic layers covering said rear surface of said hard face, each of said plurality of glass-ceramic layers comprising crystalline bodies; and
at least one resilient layer disposed along a rear surface of at least one of said plurality of overlapping glass-ceramic layers opposite said hard face.

15. The ballistic armor of claim 14, wherein said hard face of each of said plurality of armor layers is fabricated from a material selected from the group consisting of boron carbide, silicon carbide, and steel.

16. The ballistic armor of claim 14, wherein each of said at least one resilient layer of said plurality of armor layers is fabricated from a material selected from the group consisting of an aramid, a polymer, and a metal.

17. The ballistic armor of claim 14, wherein each of said at least one resilient layer of said plurality of armor layers is fabricated from titanium.

18. The ballistic armor of claim 14, wherein each of said at least one resilient layer of said plurality of armor layers includes a first resilient layer and a second resilient layer, said first resilient layer being fabricated from a metal and said second resilient layer being fabricated from a material selected from the group consisting of an aramid, a polymer, and a metal.

19. The ballistic armor of claim 18, wherein said first resilient layer is disposed along said corresponding plurality of glass-ceramic layers and said second resilient layer is disposed along said first resilient layer opposite said corresponding plurality of glass-ceramic layers.

* * * * *